(12) United States Patent
Han et al.

(10) Patent No.: US 10,931,515 B2
(45) Date of Patent: Feb. 23, 2021

(54) METHOD FOR DETECTING AND PROCESSING RADIO LINK AND APPARATUS

(71) Applicant: HUAWEI TECHNOLOGIES CO., LTD., Guangdong (CN)

(72) Inventors: Feng Han, Shanghai (CN); Wenqi Sun, Shenzhen (CN); Yinghao Jin, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/370,464

(22) Filed: Mar. 29, 2019

(65) Prior Publication Data

US 2019/0229980 A1 Jul. 25, 2019

Related U.S. Application Data

(63) Continuation of application No. PCT/CN2017/104087, filed on Sep. 28, 2017.

(30) Foreign Application Priority Data

Sep. 30, 2016 (CN) .............................. 201610877308

(51) Int. Cl.
*H04L 12/24* (2006.01)
*H04B 17/309* (2015.01)
(Continued)

(52) U.S. Cl.
CPC ....... *H04L 41/0668* (2013.01); *H04B 17/309* (2015.01); *H04L 41/0677* (2013.01);
(Continued)

(58) Field of Classification Search
None
See application file for complete search history.

(56) References Cited

U.S. PATENT DOCUMENTS 8,488,443 B2  7/2013 Lee et al.
2011/0103221 A1* 5/2011 Lee .................... H04L 5/0007
                                                     370/216

(Continued)

FOREIGN PATENT DOCUMENTS

CN     1980467 A   6/2007
CN   101018354 A   8/2007
(Continued)

OTHER PUBLICATIONS

XP051096585 R1-164121 Intel Corporation,"Discussion on RLM for PSCell in dual connectivity",3GPP TSG-RAN WG1 #85,Nanjing, China, May 23-27, 2016,total 4 pages.

(Continued)

*Primary Examiner* — Ayaz R Sheikh
*Assistant Examiner* — Faiyazkhan Ghafoerkhan
(74) *Attorney, Agent, or Firm* — Westerman, Hattori, Daniels & Adrian, LLP

(57) ABSTRACT

The embodiments of the present invention disclose a method for detecting and processing a radio link and an apparatus. The method includes: configuring, by a access network device, independent radio link detection parameters for one or more wireless physical layer parameters used by a terminal device; and detecting, by the terminal device, radio links of the one or more wireless physical layer parameters, reporting a detected radio link failure of a wireless physical layer parameter to the access network device, and processing, under scheduling and configuration performed by the access network device, data on the wireless physical layer parameter whose radio link fails.

6 Claims, 8 Drawing Sheets

(51) Int. Cl.
*H04W 24/04* (2009.01)
*H04W 4/70* (2018.01)
*H04W 76/27* (2018.01)

(52) U.S. Cl.
CPC ............ *H04W 4/70* (2018.02); *H04W 24/04* (2013.01); *H04W 76/27* (2018.02)

(56) References Cited

U.S. PATENT DOCUMENTS

| | | |
|---|---|---|
| 2011/0250880 A1 | 10/2011 | Olsson |
| 2012/0002535 A1* | 1/2012 | Droux ................. G06F 9/45558 370/216 |
| 2012/0093005 A1* | 4/2012 | Li ......................... H04L 41/064 370/242 |
| 2013/0010620 A1 | 1/2013 | Dinan |
| 2013/0033981 A1* | 2/2013 | Droux ................... H04L 45/245 370/228 |
| 2014/0233396 A1* | 8/2014 | Marinier ................ H04L 5/001 370/242 |
| 2015/0029835 A1 | 1/2015 | Zhang et al. |
| 2015/0094063 A1* | 4/2015 | Hu ........................ H04W 36/24 455/436 |
| 2016/0255487 A1* | 9/2016 | Abu-Hakima ........ H04W 4/029 455/404.2 |
| 2017/0048736 A1* | 2/2017 | Marinier .............. H04W 24/08 |
| 2017/0171903 A1* | 6/2017 | Kubota ................. H04W 76/19 |
| 2018/0048413 A1* | 2/2018 | Liu ....................... H04W 48/18 |
| 2018/0049047 A1* | 2/2018 | Lin ....................... H04W 24/02 |
| 2018/0049169 A1* | 2/2018 | Lin ....................... H04L 5/0051 |
| 2019/0132172 A1* | 5/2019 | Saito .................. H04L 25/0224 |
| 2019/0132759 A1* | 5/2019 | Park .................... H04L 5/0051 |
| 2019/0182856 A1* | 6/2019 | Moroga ............... H04W 72/04 |
| 2019/0230580 A1* | 7/2019 | Kim ..................... H04W 48/12 |
| 2019/0245603 A1* | 8/2019 | Yum ..................... H04B 7/0617 |
| 2019/0313443 A1* | 10/2019 | Li ..................... H04W 56/0045 |

FOREIGN PATENT DOCUMENTS

| | | |
|---|---|---|
| CN | 101150382 A | 3/2008 |
| CN | 101815314 A | 8/2010 |
| CN | 101883377 A | 11/2010 |
| CN | 102084681 A | 6/2011 |
| CN | 102439916 A | 5/2012 |
| CN | 102939777 A | 2/2013 |
| CN | 103379517 A | 10/2013 |
| CN | 103384382 A | 11/2013 |
| CN | 104956715 A | 9/2015 |

OTHER PUBLICATIONS

XP051161190 3GPP TS 36.331 V14.0.0 (Sep. 2016),3rd Generation Partnership Project:Technical Specification Group Radio Access Network;Evolved Universal Terrestrial Radio Access (E-UTRA);Radio Resource Control (RRC);Protocol specification(Release 14),total 644 pages.
Ericsson,"Operation in higher frequencies",3GPP TSG-RAN WG2 #94 Tdoc R2-163995,Nanjing, P.R. China, May 23-27, 2016,total 4 pages.
3GPP TS 36.331 V13.2.0 (Jun. 2016);3rd Generation Partnership Project;Technical Specification Group Radio Access Network;Evolved Universal Terrestrial Radio Access (E-UTRA);Radio Resource Control (RRC);Protocol specification(Release 13),total 623 pages.
3GPP TS 36.133 V14.0.0 (Jun. 2016);3rd Generation Partnership Project;Technical Specification Group Radio Access Network;Evolved Universal Terrestrial Radio Access (E-UTRA);Requirements for support of radio resource management(Release 14),total 1563 pages.
3GPP TR 38.804 V0.0.1 (May 2016);3rd Generation Partnership Project;Technical Specification Group Radio Access Network;Study on New Radio Access Technology;Radio Interface Protocol Aspects(Release 14),total 10 pages.
Office Action dated Jul. 24, 2020, issued in counterpart CN Application No. 201610877308.3, with English Translation. (27 pages).
Office Action dated Dec. 18, 2020, issued in counterpart CN Application No. 201610877308.3, with English Translation. (19 pages).

* cited by examiner

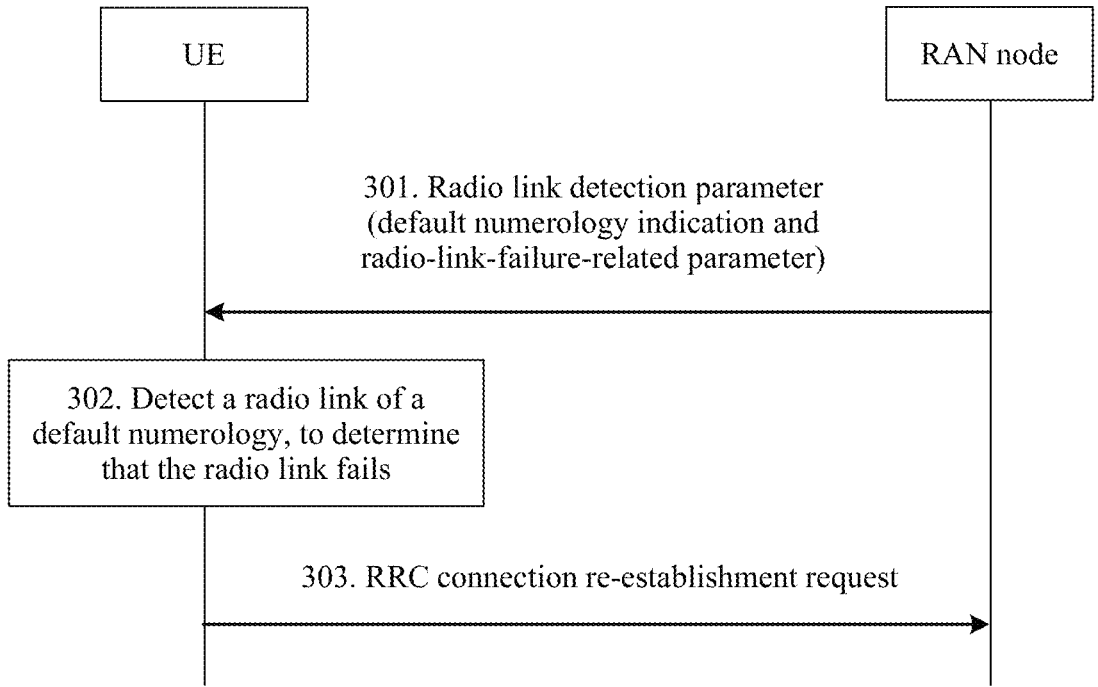

FIG. 3

> Default numerology indication
> Radio-link-failure-related parameters, for example:
>> N310: Number of consecutive out-of-sync indications
>> N311: Number of consecutive in-sync indications
>> X (block error rate %): If measured quality of a radio link is less than a measurement threshold Qout corresponding to X, it is considered that out-of-sync occurs
>> Y (block error rate %): If measured quality of a radio link is greater than a measurement threshold Qin corresponding to Y, it is considered that in-sync occurs
>> T310: Timer duration for which UE and a RAN node are allowed to resume in-synchronization
>> Maximum number of RLC retransmissions

FIG. 4

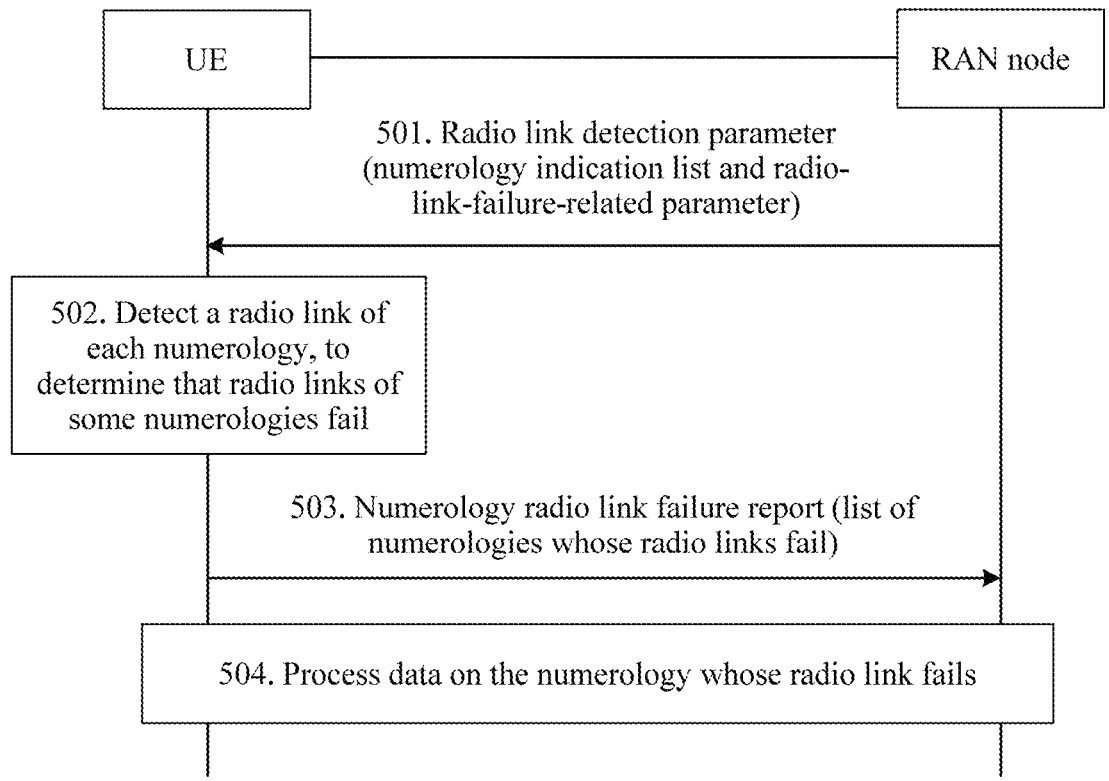

FIG. 5

> Numerology indication list
  >> Radio-link-failure-related parameters corresponding to a numerology, for example:
    >>> N310: Number of consecutive out-of-sync indications
    >>> N311: Number of consecutive in-sync indications
    >>> X (block error rate %): If measured quality of a radio link is less than a measurement threshold Qout corresponding to X, it is considered that out-of-sync occurs
    >>> Y (block error rate %): If measured quality of a radio link is greater than a measurement threshold Qin corresponding to Y, it is considered that in-sync occurs
    >>> T310: Timer duration for which UE and a RAN node are allowed to resume in-synchronization
    >>> Maximum number of RLC retransmissions

FIG. 6

> Numerology indication list
> Numerology detection activation/deactivation indication
   >> If a detection indication is activation, radio-link-failure-related parameters corresponding to a numerology are, for example,
      >>> N310: Number of consecutive out-of-sync indications
      >>> N311: Number of consecutive in-sync indications
      >>> X (block error rate %): If measured quality of a radio link is less than a measurement threshold Qout corresponding to X, it is considered that out-of-sync occurs
      >>> Y (block error rate %): If measured quality of a radio link is greater than a measurement threshold Qin corresponding to Y, it is considered that in-sync occurs
      >>> T310: Timer duration for which UE and a RAN node are allowed to resume in-synchronization
      >>> Maximum number of RLC retransmissions

FIG. 7

> Carrier/cell indication list
   >> Radio-link-failure-related parameters corresponding to a carrier/cell, for example:
      >>> N310: Number of consecutive out-of-sync indications
      >>> N311: Number of consecutive in-sync indications
      >>> X (block error rate %): If measured quality of a radio link is less than a measurement threshold Qout corresponding to X, it is considered that out-of-sync occurs
      >>> Y (block error rate %): If measured quality of a radio link is greater than a measurement threshold Qin corresponding to Y, it is considered that in-sync occurs
      >>> T310: Timer duration for which UE and a RAN node are allowed to resume in-synchronization
      >>> Maximum number of RLC retransmissions

FIG. 8

> Carrier/cell indication list
  >> Numerology indication list of a carrier/cell
    >>> Radio-link-failure-related parameters corresponding to a numerology, for example:
      >>>> N310: Number of consecutive out-of-sync indications
      >>>> N311: Number of consecutive in-sync indications
      >>>> X (block error rate %): If measured quality of a radio link is less than a measurement threshold Qout corresponding to X, it is considered that out-of-sync occurs
      >>>> Y (block error rate %): If measured quality of a radio link is greater than a measurement threshold Qin corresponding to Y, it is considered that in-sync occurs
      >>>> T310: Timer duration for which UE and a RAN node are allowed to resume in-synchronization
      >>>> Maximum number of RLC retransmissions

FIG. 9

> RAN node indication list
  >> Carrier/cell indication list of a RAN node
    >>> Radio-link-failure-related parameters corresponding to a carrier/cell, for example:
      >>>> N310: Number of consecutive out-of-sync indications
      >>>> N311: Number of consecutive in-sync indications
      >>>> X (block error rate %): If measured quality of a radio link is less than a measurement threshold Qout corresponding to X, it is considered that out-of-sync occurs
      >>>> Y (block error rate %): If measured quality of a radio link is greater than a measurement threshold Qin corresponding to Y, it is considered that in-sync occurs
      >>>> T310: Timer duration for which UE and a RAN node are allowed to resume in-synchronization
      >>>> Maximum number of RLC retransmissions

FIG. 10

> RAN node indication list
  >> Carrier/cell indication list of a RAN node
    >>> Numerology indication list of a carrier/cell
      >>>> Radio-link-failure-related parameters corresponding to a numerology, for example:
        >>>>> N310: Number of consecutive out-of-sync indication times
        >>>>> N311: Number of consecutive in-sync indication times
        >>>>> X (block error rate %): If measured quality of a radio link is less than a measurement threshold Qout corresponding to X, it is considered that out-of-sync occurs
        >>>>> Y (block error rate %): If measured quality of a radio link is greater than a measurement threshold Qin corresponding to Y, it is considered that in-sync occurs
        >>>>> T310: Timer duration for which UE and a RAN node are allowed to resume in-synchronization
        >>>>> Maximum number of RLC retransmissions

FIG. 11

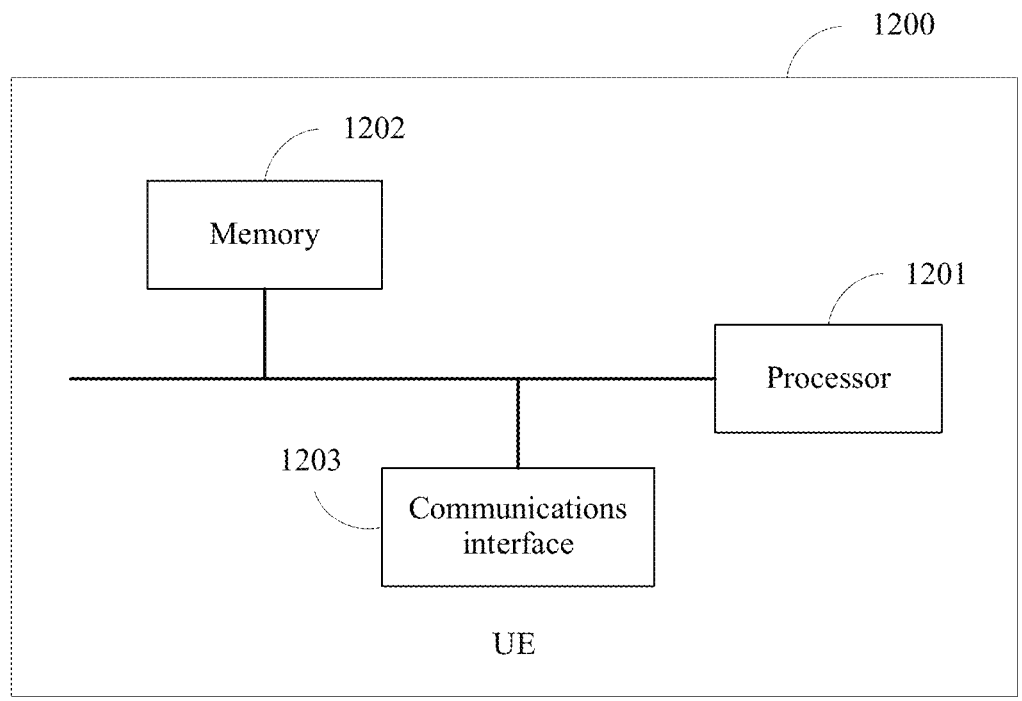

FIG. 12

METHOD FOR DETECTING AND PROCESSING RADIO LINK AND APPARATUS

CROSS-REFERENCE TO RELATED APPLICATIONS

This application is a continuation of International Application No. PCT/CN2017/104087, filed on Sep. 28, 2017, which claims priority to Chinese Patent Application No. 201610877308.3, filed on Sep. 30, 2016. The disclosures of the aforementioned applications are hereby incorporated by reference in their entireties.

TECHNICAL FIELD

The embodiments of the present invention relate to the wireless network communications field, and in particular, to a method for detecting and processing a radio link and an apparatus.

BACKGROUND

With quick development of wireless communications technologies, a 5th generation (5G) wireless communications technology has been a hotspot in the current industry. 5G supports diversified application requirements, including higher-rate experience, a wider-bandwidth access capability, lower-latency and highly-reliable information exchange, access and management of larger-scale and low-cost machine-type communications devices, and the like. In addition, 5G supports application scenarios of various vertical industries, such as the Internet of Vehicles, mission critical communications, and the Industrial Internet. Faced with the performance requirements and the application scenarios of 5G, a 5G network needs to better cater to a specific user requirement, and a customization capability of the 5G network needs to be further improved.

A conventional LTE system maintains fixed wireless physical layer parameters (Numerology) in a single-carrier scenario and a carrier aggregation scenario, and the fixed wireless physical layer parameters include a subframe (subframe) length of 1 ms, a subcarrier spacing of 15 KHz, a symbol length of approximately 70 µs, a cyclic prefix (CP) length of approximately 5 µs, and the like. To meet a customization capability requirement of 5G, and to better support various service types and application scenarios, a plurality of numerologies are introduced in next-generation radio (NR), and the numerologies may correspond to different subcarrier spacings, different subframe lengths, and the like.

In a wireless network, due to a feature of a radio channel, user equipment (UE) goes through different radio link states at different positions at a same moment or at a same position at different moments. Therefore, to ensure communication service quality, the UE is required to measure radio link quality, to be capable of detecting a radio link failure in a timely manner, and to re-establish a radio resource control (RRC) connection. An NR network supports a plurality of numerologies, and radio links corresponding to the numerologies present different features. It is difficult to meet, by detecting the link failure and re-establishing the RRC connection by using a method for detecting a radio link in the existing LTE system, requirements of detecting and processing radio links of the plurality of numerologies in the NR network.

SUMMARY

Embodiments of the present invention provide a method for detecting and processing a radio link and an apparatus, to provide, to UE using a plurality of numerologies, a method for detecting a radio link for different numerologies and for processing a radio link when the radio link fails.

According to a first aspect, an embodiment of the present invention provides a method for detecting and processing a radio link. The method includes: setting, by an access network device, radio link detection parameters of a plurality of wireless physical layer parameters, where the plurality of wireless physical layer parameters correspond to different radio links, and the radio link detection parameters include indication information used to indicate at least one wireless physical layer parameter; sending, by the access network device, the radio link detection parameters to a terminal device; receiving, by the access network device, a radio link failure report reported by the terminal device, where the radio link failure report includes information about a failed radio link; and interacting, by the access network device, with the terminal device to process data on the failed radio link.

In one embodiment, the radio link detection parameters include a default wireless physical layer parameter indication and a radio-link-failure-related parameter of a default wireless physical layer parameter, and the radio-link-failure-related parameter includes at least one of the following: a number of consecutive out-of-synchronization indications, a number of consecutive in-synchronization indications, a radio link quality parameter for out-of-synchronization corresponding to a given block error rate, a radio link quality parameter for in-synchronization corresponding to a given block error rate, timer duration for which the terminal device and the access network device are allowed to resume in-synchronization, and a maximum number of radio link control retransmissions.

In one embodiment, the radio link detection parameters include a wireless physical layer parameter indication list and a radio-link-failure-related parameter of each wireless physical layer parameter; and the wireless physical layer parameter indication list includes an indication of at least one wireless physical layer parameter used by the terminal device.

In one embodiment, the radio link detection parameters include a wireless physical layer parameter indication list of a carrier/cell and a radio-link-failure-related parameter of each wireless physical layer parameter, and each carrier/cell uses a plurality of wireless physical layer parameters.

In one embodiment, the radio link detection parameters include a RAN node indication list, a carrier/cell indication list of each RAN node, a wireless physical layer parameter indication list of each carrier/cell, and a radio-link-failure-related parameter of each wireless physical layer parameter, and each carrier/cell uses a plurality of wireless physical layer parameters.

In one embodiment, the radio link detection parameters include a wireless physical layer parameter detection activation/deactivation indication, and the wireless physical layer parameter detection activation/deactivation indication is used to activate or deactivate detection on a radio link corresponding to a wireless physical layer parameter indication.

In one embodiment, the processing data on the failed radio link includes: suspending, by the access network device, scheduling of data transmission on the failed radio link; or scheduling, by the access network device, the data on the failed radio link to a normal radio link for transmission; or transmitting, by the access network device, to-be-retransmitted data on the failed radio link by using a normal radio link.

According to a second aspect, an embodiment of the present invention provides a method for detecting and processing a radio link. The method includes: receiving, by a terminal device, radio link detection parameters sent by an access network device, where the radio link detection parameters include radio link detection parameters of a plurality of wireless physical layer parameters, the plurality of wireless physical layer parameters correspond to different radio links, and the radio link detection parameters include indication information used to indicate at least one wireless physical layer parameter; sending, by the terminal device, a radio link failure report to the access network device, where the radio link failure report includes information about a failed radio link; and interacting, by the terminal device, with the access network device to process data on the failed radio link.

In one embodiment, the processing data on the failed radio link includes: scheduling, by the terminal device through scheduling performed by the access network device, the data on the failed radio link to a normal radio link for transmission; or transmitting, by the terminal device, to-be-retransmitted data on the failed radio link by using a normal radio link through scheduling performed by the access network device.

According to a third aspect, an embodiment of the present invention provides an access network device, where the access network device includes a communications interface and a processor. The communications interface is configured to send radio link detection parameters of a plurality of wireless physical layer parameters to a terminal device, where the plurality of wireless physical layer parameters correspond to different radio links, and the radio link detection parameters include indication information used to indicate at least one wireless physical layer parameter, and the communications interface is configured to receive a radio link failure report reported by the terminal device, where the radio link failure report includes information about a failed radio link; and the processor is configured to process the data on the failed radio link.

In one embodiment, the radio link detection parameters include a default wireless physical layer parameter indication and a radio-link-failure-related parameter of a default wireless physical layer parameter, and the radio-link-failure-related parameter includes at least one of the following: a number of consecutive out-of-synchronization indications, a number of consecutive in-synchronization indications, a radio link quality parameter for out-of-synchronization corresponding to a given block error rate, a radio link quality parameter for in-synchronization corresponding to a given block error rate, timer duration for which the terminal device and the access network device are allowed to resume in-synchronization, and a maximum number of radio link control retransmissions.

In one embodiment, the radio link detection parameters include a wireless physical layer parameter indication list and a radio-link-failure-related parameter of each wireless physical layer parameter; and the wireless physical layer parameter indication list includes an indication of at least one wireless physical layer parameter used by the terminal device.

In one embodiment, the radio link detection parameters include a wireless physical layer parameter indication list of a carrier/cell and a radio-link-failure-related parameter of each wireless physical layer parameter, and each carrier/cell uses a plurality of wireless physical layer parameters.

In one embodiment, the radio link detection parameters include a RAN node indication list, a carrier/cell indication list of each RAN node, a wireless physical layer parameter indication list of each carrier/cell, and a radio-link-failure-related parameter of each wireless physical layer parameter, and each carrier/cell uses a plurality of wireless physical layer parameters.

With reference to the third aspect, in a fifth possible implementation of the third aspect, the radio link detection parameters include a wireless physical layer parameter detection activation/deactivation indication, and the wireless physical layer parameter detection activation/deactivation indication is used to activate or deactivate detection on a radio link corresponding to a wireless physical layer parameter indication.

In one embodiment, the processing the data on the failed radio link includes: suspending, by the access network device, scheduling of data transmission on the failed radio link; or scheduling, by the access network device, the data on the failed radio link to a normal radio link for transmission; or transmitting, by the access network device, to-be-retransmitted data on the failed radio link by using a normal radio link.

According to a fourth aspect, an embodiment of the present invention provides a terminal device, where the terminal device includes a communications interface and a processor. The communications interface is configured to receive radio link detection parameters sent by an access network device, where the radio link detection parameters include radio link detection parameters of a plurality of wireless physical layer parameters, the plurality of wireless physical layer parameters correspond to different radio links, and the radio link detection parameters include indication information used to indicate at least one wireless physical layer parameter, and the communications interface is configured to send a radio link failure report to the access network device, where the radio link failure report includes information about a failed radio link; and the processor is configured to process data on the failed radio link.

In one embodiment, the processing data on the failed radio link includes: scheduling, by the terminal device through scheduling performed by the access network device, the data on the failed radio link to a normal radio link for transmission; or transmitting, by the terminal device, to-be-retransmitted data on the failed radio link by using a normal radio link through scheduling performed by the access network device.

In the embodiments of the present invention, the access network device configures independent radio link detection parameters for one or more wireless physical layer parameters used by the terminal device; the terminal device detects radio links of the one or more wireless physical layer parameters, reports a detected radio link failure of a wireless physical layer parameter to the access network device, and processes, under scheduling and configuration performed by the access network device, data on the wireless physical layer parameter whose radio link fails. An independent radio link of each wireless physical layer parameter is detected, thereby ensuring minimization of communication impact between different wireless physical layer parameters of the terminal device, reducing processes of triggering link re-establishment by the terminal device, and ensuring that data transmission is as continuous as possible.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

FIG. 3 is a schematic flowchart of a method for detecting and processing a radio link according to an embodiment of the present invention;

FIG. 4 shows one type of information about radio link detection parameters according to an embodiment of the present invention;

FIG. 5 is a schematic flowchart of another method for detecting and processing a radio link according to an embodiment of the present invention;

FIG. 6 shows another type of information about radio link detection parameters according to an embodiment of the present invention;

FIG. 7 shows another type of information about radio link detection parameters according to an embodiment of the present invention;

FIG. 8 shows another type of information about radio link detection parameters according to an embodiment of the present invention;

FIG. 9 shows another type of information about radio link detection parameters according to an embodiment of the present invention;

FIG. 10 shows another type of information about radio link detection parameters according to an embodiment of the present invention;

FIG. 11 shows another type of information about radio link detection parameters according to an embodiment of the present invention;

FIG. 12 is a schematic structural diagram of UE according to an embodiment of the present invention;

DESCRIPTION OF EMBODIMENTS

Figure 1:
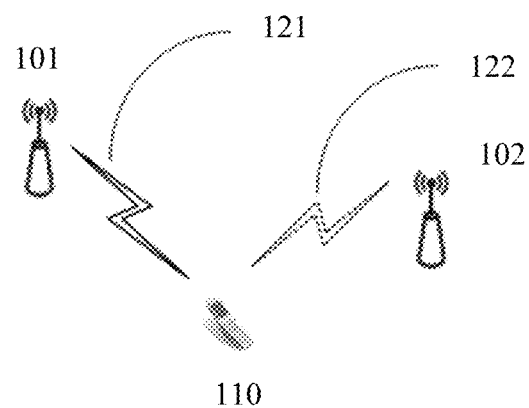
FIG. 1 is a schematic diagram of an NR network scenario according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. The following several specific embodiments may be combined with each other, and a same or similar concept or process may not be described repeatedly in some embodiments. All other embodiments obtained by a person of ordinary skill in the art based on the embodiments of the present invention without creative efforts shall fall within the protection scope of the present invention.

In this application, the word "example" is used to represent giving an example, an illustration, or a description. Any embodiment described as "example" in this application should not be explained as being more preferred or having more advantages than another embodiment. To enable any person skilled in the art to implement and use the present invention, the following description is provided. Details are listed in the following description for explanation. It should be understood that a person of ordinary skill in the art may learn that the present invention can be implemented without using these specific details. In another instance, a well-known structure and a well-known process are not described in detail, to avoid obscure description of the present invention caused by unnecessary details. Therefore, the present invention is not limited to the shown embodiments, but is consistent with a maximum scope of a principle and features that are disclosed in this application.

In the specification, claims, and accompanying drawings of the present invention, the terms "first", "second", "third", "fourth", and the like (if existent) are intended to distinguish between similar objects but do not necessarily indicate a specific order or sequence. It should be understood that the data termed in such a way is interchangeable in proper circumstances so that the embodiments of the present invention described herein can be implemented in other orders than the order illustrated or described herein. Moreover, the terms "include", "contain", and any other variants thereof mean to cover the non-exclusive inclusion. For example, a process, method, system, product, or device that includes a list of operations or units is not necessarily limited to those operations or units expressed listed, but may include other units not expressly listed or inherent to such a process, method, system, product, or device.

The terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Specific embodiments are used below to describe in detail the technical solutions of the present invention. The following several specific embodiments may be combined with each other, and a same or similar concept or process may not be described repeatedly in some embodiments.

A method for detecting and processing a radio link and an apparatus that are provided in the embodiments of the present invention are applicable to detection of a radio link between UE and a radio access network (RAN) node and to processing of the radio link after the radio link fails, especially to a scenario in which a radio access network and the UE support one or more numerologies, as shown in FIG. 1. In FIG. 1, UE 110 transmits data to a RAN node 101 through a radio link 121. In one embodiment, the UE 110 may further transmit data to a RAN node 102 through a radio link 122 in a multi-connection manner. In this case, the RAN node 101 is a primary RAN node, and the RAN node 102 is a secondary RAN node. One RAN node in an NR network may support sending of one and/or more numerology signals on one and/or more carriers/cells. Different numerology signals may correspond to different service types. For example, the NR network may transmit data by using different numerologies for an enhanced mobile broadband (eMBB) service, a massive machine type communication (mMTC) service, and an ultra-reliable and low latency communications (URLLC) service. For example, the URLLC service may be based on a short subframe length, the eMBB service may be based on a long subframe length, and the mMTC service may be based on a long CP. For a single-carrier scenario, it is discussed and approved at the 3GPP RAN1 #86 meeting that the NR network supports multiplexing of a plurality of numerologies through FDM/TDM or a combination of FDM and TDM, and one UE may support a plurality of numerologies. When the carrier supports both the URLLC service and the eMBB service, semi-static or dynamic radio resource sharing between the two services should be considered. For a carrier aggregation scenario, it is discussed and approved at the 3GPP RAN2 #95 meeting that different carriers may support different numerologies. For example, for a carrier working at a high frequency, a large subcarrier spacing may be used, but for a carrier working at a relatively low frequency, an LTE subcarrier spacing may be used.

In an LTE system, based on the TS 36.133 specification, in the single-carrier scenario, the UE in an RRC connected mode detects a radio link on a system carrier of a serving cell based on a reference signal. When detecting that cell reference signal strength is less than a signal strength threshold that is set by the system and that corresponds to a block error rate of 10%, the UE considers that out-of-synchronization (out-of-sync) occurs once. When the UE learns through continuous detection that a number of out-of-sync times reaches a number of times that is indicated by a counter N310 and that is set by the system, the UE starts a timer T310 and starts timing. When a time measured by T310 does not exceed duration set by the system, if the UE detects that the cell reference signal strength is greater than a signal strength threshold that is set by the system and that corresponds to a block error rate of 2%, the UE considers that in-synchronization (in-sync) is resumed once. When the UE learns through continuous detection that a number of in-sync times reaches a number of times that is indicated by a counter N311 and that is set by the system, the UE stops the timer T310, and determines that the UE maintains an RRC connection to the serving cell. If the UE has not detected in-sync N311 times before T310 expires, it is determined that a radio link between the UE and the serving cell fails. In addition, when the UE fails to perform random access, or radio link control (RLC) retransmission is performed for a maximum number of retransmissions, it is also determined that a radio link failure is detected. In this case, data transmission between the UE and the serving cell is interrupted. Afterward, the UE initiates an RRC connection re-establishment request to the serving cell, to attempt to re-establish the RRC connection. In the carrier aggregation scenario, the UE detects a radio link of only a primary cell (PCell), but does not detect a radio link of a secondary cell (SCell). When the link of the PCell fails, the UE enables re-establishment of an RRC connection. In a dual connectivity scenario, in addition to a radio link of a PCell of a master eNB (MeNB), the UE detects a radio link of a primary secondary cell (PSCell) of a secondary eNB (SeNB). When the radio link of the PCell fails, the UE enables re-establishment of an RRC connection. When the radio link of the PSCell fails, the UE notifies, by using an RRC message, the MeNB that the radio link of the PSCell fails. In this case, data transmission between the UE and the SeNB is interrupted. To resume dual connectivity, the MeNB needs to re-enable a signaling procedure for adding an SeNB based on a measurement result of the UE.

The NR network supports a plurality of numerologies, and radio links corresponding to the numerologies present different features. For example, different numerologies may use different reference signals on different time-frequency resources. Results of measuring different reference signals of the numerologies by UE supporting the plurality of numerologies may be different. In addition, if the UE measures a reference signal of one numerology, and enables re-establishment of an RRC connection when detecting that a radio link corresponding to the numerology fails, negative impact on a communication connection of another normal numerology is caused. In addition, the NR network may work at a high frequency band (>6 GHz), and a high frequency band communications technology based on a narrow beam often causes faster radio link quality deterioration than that at low frequency band communication. In addition, the high frequency band has wider available bandwidth, and frequency selective fading is more prominent, causing an significant difference from a link feature of a low frequency band. At the high frequency band, if the UE conforms to an LTE standard to detect radio links of only some cells (such as the PCell and the PSCell), detection results of the UE cannot reflect signal quality of another cell (for example, the SCell). Even if the radio links of the some cells fail, a radio link of another cell may still maintain good communication quality. If the method for detecting a radio link in the existing LTE system is used to detect a link failure and to re-establish an RRC connection, detection or differentiation processing cannot be desirably performed on links of different numerologies in the NR network, and it is difficult to maintain transmission quality of a plurality of service types in the NR network.

In the embodiments of the present invention, a RAN node configures independent radio link detection parameters for one or more numerologies used by UE. The UE detects radio links of the one or more numerologies, reports a detected radio link failure of a numerology to the RAN node, and processes, under scheduling and configuration performed by the RAN node, data on the numerology whose radio link fails. An independent radio link of each numerology is detected, thereby ensuring minimization of communication impact among different numerologies of the terminal device, reducing processes of triggering link re-establishment by the UE, and ensuring that data transmission is as continuous as possible.

Figure 2:
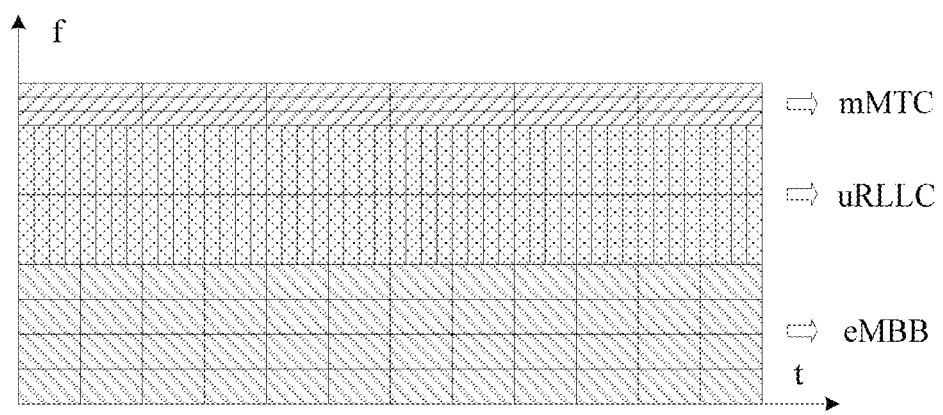
FIG. 2 is a schematic diagram of a frame structure at a physical layer of an NR network according to an embodiment of the present invention.

FIG. 2 is a schematic diagram of a frame structure at an NR physical layer according to an embodiment of the present invention. As shown in FIG. 2, an NR network may divide system bandwidth into different subbands, and different service signals are sent by using different numerologies at each subband. For example, for a high throughput feature of an eMBB service, a numerology of a long subframe length may be used; for a small packet service feature of an mMTC service, a numerology of small subcarrier bandwidth may be used; for a low latency feature of a URLLC service, a numerology of a short subframe length may be used. Correspondingly, UE may support one or more types of services. Therefore, data transmission may be performed by using one or more numerologies. In this embodiment of the present invention, the NR network configures one identifier for each numerology supported by the NR network. A RAN node may allocate a numerology identifier to the UE when the UE accesses the NR network, or allocate a numerology identifier to the UE in an RRC connection configuration message after the UE accesses the network.

FIG. 3 is a schematic flowchart of a method for detecting and processing a radio link according to an embodiment of the present invention. The procedure includes the following operations.

Operation 301. A RAN node sends radio link detection parameters to UE.

The radio link detection parameters are shown in FIG. 4, and include a default numerology indication and a radio-link-failure-related parameter.

In this embodiment of the present invention, the UE communicates with the RAN node by using one or more numerologies, and the RAN node may designate, by using RRC signaling, one of the one or more numerologies as a default numerology used by the UE to detect a radio link, and instruct the UE to detect a radio link of the default numerology. In one embodiment, the numerology indication may include an identifier of the numerology, corresponding air interface radio resources (such as a time-frequency resource and a code domain resource), a reference signal configuration, and the like. In one embodiment, the numerology indication may include corresponding air interface radio resources (such as a time-frequency resource and a code domain resource), a reference signal configuration, and the like. The radio-link-failure-related parameter may include a counter parameter N310, a counter parameter N311, a packet error rate parameter X, a packet error rate parameter Y, a timer parameter T310, and a maximum number of RLC retransmissions. For example, a configuration of the radio link detection parameters may be sent by the RAN node to the UE when the UE accesses a network or in an RRC connection configuration message of the UE, or may be sent by the RAN node to the UE by using a broadcast message.

Operation 302. The UE detects a radio link of a default numerology, to determine that the radio link fails.

In this embodiment of the present invention, the UE detects the radio link of the default numerology based on the received configuration of the radio link detection parameters, and determines, by using the radio-link-failure-related parameter, whether the radio link of the default numerology fails. In one embodiment, the UE may measure a reference signal on a time-frequency resource occupied by the default numerology, to determine quality of the radio link of the default numerology, and determine, based on a received related parameter of N310/N311/X/Y/T310 corresponding to the default numerology, that the radio link of the default numerology fails. In one embodiment, the UE may detect that a number of RLC retransmissions of data transmitted on the default numerology is greater than a received maximum number of retransmissions that corresponds to the default numerology, to determine that the radio link of the default numerology fails.

Operation 303. The UE initiates an RRC connection re-establishment request to the RAN node.

In this embodiment of the present invention, when determining that the radio link of the default numerology fails, the UE initiates the RRC connection re-establishment request to the RAN node. In one embodiment, access stratum security of the UE is in an active state, and the UE initiates the RRC connection re-establishment request to the RAN node. In one embodiment, access stratum security of the UE is not activated, and the UE directly enters an RRC idle mode.

If the RAN node successfully receives the RRC connection re-establishment request initiated by the UE, the RAN node re-establishes an RRC connection for the UE. If the RAN node fails to receive the RRC connection re-establishment request initiated by the UE, the RAN node requests a network side to release a context of the UE.

FIG. 5 is a schematic flowchart of another method for detecting and processing a radio link according to an embodiment of the present invention. Compared with the embodiment shown in FIG. 3, in this embodiment, UE detects and processes radio links of a plurality of currently used numerologies. As shown in FIG. 5, the method includes the following operations.

Operation 501. A RAN node sends radio link detection parameters to the UE.

The radio link detection parameters include an indication list of a plurality of numerologies currently used by the UE and a radio-link-failure-related parameter of each numerology.

In this embodiment of the present invention, the RAN node configures the UE to detect radio links of the plurality of currently used numerologies, and configures the corresponding radio-link-failure-related parameter for each numerology. In one embodiment, the radio link detection parameters configured by the RAN node for the UE are shown in FIG. 6. For example, if the UE currently uses N (N is an integer greater than 1) numerologies, the radio link detection parameters configured by the RAN node for the UE include a numerology indication list (Numerology_1, Numerology_2, . . . , and Numerology_N) and a radio-link-failure-related parameter set corresponding to N numerologies that is shown in FIG. 6. For each of the numerologies, the RAN node may instruct the UE to use different radio-link-failure-related parameters. For example, for a numerology corresponding to a URLLC service, a value of a parameter X may be less than a value of a parameter X of a numerology corresponding to an eMBB service.

Further, the numerology indication list may be used to instruct the UE to report a numerology link failure report to the RAN node in a numerology priority order in the list after the UE detects that radio links of some numerologies fail. For example, the numerology indication list is (a numerology 1, a numerology 2, a numerology 3, a numerology 4, and a numerology 5). If the UE detects that radio links of the numerology 1 and the numerology 3 fail, the UE preferentially reports a numerology radio link failure report to the RAN node by using the numerology 2. A configuration of the radio link detection parameters may be sent by the RAN node to the UE by using an RRC connection reconfiguration message, or may be sent by the RAN node to the UE by using a broadcast message.

Operation 502. The UE detects a radio link of a configured numerology, to determine that radio links of some numerologies fail.

In this embodiment of the present invention, the UE detects a radio link of each numerology in the configured numerology indication list based on the received radio link detection parameters, and determines, by using the radio-link-failure-related parameter, whether the radio link of each numerology for the UE fails. The UE detects radio links of all numerologies in the configured numerology indication list by using the method in operation 302 in the foregoing embodiment, to determine that radio links of some numerologies fail. For example, the RAN node configures the UE to detect radio links of three numerologies, and the UE determines, through detection, that radio links of one or two of the three numerologies fail.

Operation 503. The UE sends a numerology radio link failure report to the RAN node.

The numerology radio link failure report includes a list of numerologies whose radio links fail.

In this embodiment of the present invention, when the UE determines that radio links of some numerologies fail, the UE selects a normal numerology to send the numerology radio link failure report to the RAN node, to report one or more numerologies whose radio links fail. The numerology whose radio link fails is included in the list of numerologies whose radio links fail. For example, the UE may select a numerology in a priority order in the numerology indication list received in operation 501, to send the numerology radio link failure report.

Operation 504. The UE and the RAN node process data on a numerology whose radio link fails.

In this embodiment of the present invention, on one hand, the UE detects that radio links of some numerologies fail, that is, a timer T310 corresponding to a numerology whose radio link fails expires, the UE continues detecting whether the radio link of the numerology is resumed. In one embodiment, if the UE detects that a number of in-sync times of the numerology whose radio link fails reaches a number of times that is indicated by a counter N311 and that is set by a system, the UE determines that the radio link of the numerology is resumed. When the radio links of the one or more numerologies are resumed, the UE may report, to the RAN node, an indication that the radio link of the numerology is resumed. On the other hand, after receiving the numerology radio link failure report, the RAN node may process data on the numerology in the following three manners:

In a manner 1, the RAN node suspends scheduling of the data on the numerology whose radio link fails, and continues scheduling the data on the numerology after receiving the indication, which is reported by the UE, that the radio link of the numerology is resumed.

In a manner 2, the RAN node schedules, to a normal numerology for transmission, the data on the numerology whose radio link fails. The RAN node may indicate a numerology on which the data on the numerology whose radio link fails is preferentially sent. For example, the RAN node may select a normal numerology in a priority order in the numerology indication list configured in operation 501, to transmit the data on the numerology whose radio link fails.

In a manner 3, the RAN node transmits, by using a normal numerology, to-be-retransmitted data on the numerology whose radio link fails. The RAN node may indicate a numerology on which the data on the numerology whose radio link fails is preferentially retransmitted. For example, the RAN node may select a normal numerology in a priority order in the numerology indication list configured in operation 501, to retransmit the data on the numerology whose radio link fails.

It should be noted that, in operation 502 in the foregoing embodiment, In one embodiment, the UE detects that radio links of all numerologies in the numerology indication list configured by the RAN node fail, and in this case, the UE does not enter operation 503, but directly initiates an RRC connection re-establishment request to the RAN node. In one embodiment, the UE detects that radio links of more than a specific number of numerologies in the numerology indication list configured by the RAN node fail, and in this case, the UE does not enter operation 503, but directly initiates an RRC connection re-establishment request to the RAN node. In one embodiment, the UE detects that a mathematical operation result (for example, weighted summation result) of number of consecutive out-of-sync times that are indicated by at least two numerologies in the numerology indication list configured by the RAN node reaches a threshold set by the system, and in this case, the UE does not enter operation 503, but directly initiates an RRC connection re-establishment request to the RAN node. In one embodiment, the RAN node may configure the UE to determine, in one of the foregoing implementations, a case in which the RRC connection re-establishment request is to be sent. For example, the UE may initiate the RRC connection re-establishment request on a default numerology, or a numerology designated by the RAN node before a radio link fails, or a numerology designated in a received broadcast message of the RAN node. A specific operation in which the UE initiates the RRC connection re-establishment request to the RAN node is similar to the implementation of operation 303 in the foregoing embodiment. Details are not described herein again.

When the UE uses a plurality of numerologies, further, to reduce power consumption and complexity of detecting radio links of the plurality of numerologies by the UE, the RAN node may indicate detection activation and/or deactivation for each numerology. For example, the RAN node configures the UE to detect radio links of only some numerologies. Radio link detection parameters of each numerology that are configured by the RAN node for the UE are shown in FIG. 7, and include a numerology indication list, a detection activation/deactivation indication corresponding to each numerology, and a radio-link-failure-related parameter corresponding to each numerology. For example, the RAN node defines a 1-bit detection indication for each numerology. For example, "1" indicates activation of detection of a radio link of the numerology, and "0" indicates deactivation of detection of the radio link of the numerology.

In this embodiment, the UE performs differentiated link detection on radio links of different numerologies based on radio link detection parameters of the different numerologies, and when radio links of one or more of the different numerologies fail, may not immediately re-establish an RRC connection, avoiding impact on data transmission of another normal numerology.

In a carrier aggregation scenario, one RAN node serves the UE by using a plurality of carriers, and one carrier may correspond to one cell. For example, a primary component carrier corresponds to a PCell, and one secondary component carrier corresponds to one SCell. The UE may support use of different numerologies on different carriers, and may further support use of a plurality of numerologies on a same carrier. In one embodiment, the UE uses a plurality of carriers, and each carrier uses one numerology. For example, the UE uses three carriers, and the UE may respectively use a first numerology, a second numerology, and a third numerology on a first carrier, a second carrier, and a third carrier, or may use a first numerology on a first carrier and a second carrier and use a second numerology on a third carrier. FIG. 8 shows radio link detection parameters of each carrier/cell that are used by UE and that are configured by a RAN node for the UE. Each carrier/cell uses one numerology. Further, the RAN node may further indicate detection activation/deactivation for each carrier/cell, for example, configure the UE to detect radio links of numerologies used by only some carriers/cells. In one embodiment, the UE supports a plurality of carriers, and each carrier may use a plurality of numerologies. For example, the UE uses two carriers, and the UE may use a first numerology on a first carrier, and use a second numerology and a third numerology on a second carrier. FIG. 9 shows radio link detection parameters of each numerology of each carrier/cell that are used by UE and that are configured by a RAN node for the UE. One carrier/cell uses one or more numerologies. Further, the RAN node may further indicate detection activation/deactivation for each numerology of one carrier/cell, for example, configure the UE to detect radio links of some numerologies used by only some carriers/cells.

Correspondingly, a procedure for detecting and processing a radio link in the carrier aggregation scenario is similar to that in the schematic flowchart of FIG. 5, and a main difference is as follows:

Different from operation 501 that a RAN node sends radio link detection parameters to the UE in the foregoing embodiment, the radio link detection parameters sent by the RAN node to the UE are shown in FIG. 8 or FIG. 9. In this embodiment of the present invention, the radio link detection parameters include an indication of a cell/carrier used by the UE. For example, if the UE uses M carriers, and correspondingly respectively uses N1, . . . , and NM (Ni is an integer greater than or equal to 1) numerologies, the radio link detection parameters configured by the RAN node for the UE include a numerology indication list (Numerology_1, Numerology_2, . . . , and Numerology_M*NM) and a radio-link-failure-related parameter set corresponding to M*NM numerologies. In one embodiment, the RAN node may designate, by using RRC signaling, one carrier/cell as a default carrier/cell used by the UE to detect a radio link, and instruct the UE to detect a radio link of the default carrier/cell; or designate, for each carrier/cell, one numerology as a default numerology used by the UE to detect a radio link, and instruct the UE to detect a radio link of the default numerology.

Different from operation 502 in the foregoing embodiment, when one carrier/cell uses one numerology, the UE detects a radio link of each carrier/cell, to determine that radio links of some carriers/cells fail. When one carrier/cell uses a plurality of numerologies, the UE detects a radio link of each numerology of each carrier/cell, to determine that radio links of some numerologies of some carriers/cells fail. In addition, a case in which the UE determines not to send a radio link failure report, but directly initiates an RRC connection re-establishment request includes: The UE detects that radio links of numerologies on all carriers in the numerology indication list configured by the RAN node fail; or the UE detects that a weighted sum of number of consecutive out-of-sync times of numerologies on at least two carriers configured by the RAN node reaches a threshold set by a network; or radio links of more than a specific number of numerologies in the numerology indication list on the carrier fail. In one embodiment, the RAN node may configure the UE to determine, in one of the foregoing implementations, a case in which the RRC connection re-establishment request is to be sent.

Different from operation 503 that the UE sends a numerology radio link failure report to the RAN node in the foregoing embodiment, when one carrier/cell uses one numerology, after detecting that radio links fail for some carriers/cells, the UE selects a proper carrier/cell in a priority order in a carrier/cell indication list to report a carrier/cell link failure report to the RAN node. When one carrier/cell uses a plurality of numerologies, after detecting that radio links of some numerologies fail, the UE may select a proper numerology of a carrier/cell in a priority order in the numerology indication list to report a carrier/cell link failure report to the RAN node.

Different from operation 504 of processing data on a numerology whose radio link fails in the foregoing embodiment, when one carrier/cell uses one numerology, the UE and the RAN node process data on the carrier/cell. Correspondingly, the procedure for processing a numerology in operation 504 is applicable to a procedure for processing a carrier/cell in this embodiment of the present invention. When one carrier/cell uses a plurality of numerologies, the UE and the RAN node process data on a plurality of numerologies of a plurality of carriers/cells. Correspondingly, the procedure for processing a numerology in operation 504 is applicable to a procedure for processing a numerology of a carrier/cell in this embodiment of the present invention. For example, the RAN node and the UE transmit, by using a normal numerology of a carrier, to-be-retransmitted data on the numerology whose radio link fails.

In this embodiment, the UE performs differentiated link detection on radio links of different numerologies based on radio link detection parameters of numerologies of different carriers, and when radio links of numerologies of one or more of the different carriers fail, may not immediately re-establish an RRC connection, avoiding impact on data transmission of another normal numerology of a carrier.

In a multi-connection scenario, a primary RAN node and one or more secondary RAN nodes each may serve the UE by using one or more carriers/cells. In one embodiment, the UE uses a plurality of carriers/cells of a plurality of RAN nodes, and each carrier/cell uses one numerology. FIG. 10 shows radio link detection parameters of each carrier/cell of each RAN node that are used by UE and that are configured by a primary RAN node for the UE. Each RAN node may serve the UE by using one or more carriers/cells, and each carrier/cell uses one numerology. Further, the RAN node may further indicate detection activation/deactivation for each carrier/cell, for example, configure the UE to detect radio links of numerologies used by only some carriers/cells. In one embodiment, the UE uses a plurality of carriers/cells, and each carrier/cell may use a plurality of numerologies. FIG. 11 shows radio link detection parameters of each numerology of each carrier/cell of each RAN node that are used by UE and that are configured by a primary RAN node for the UE. Each RAN node may serve the UE by using one or more carriers/cells, and each carrier/cell uses a plurality of numerologies. Further, the RAN node may further indicate detection activation/deactivation for each numerology of one carrier/cell, for example, configure the UE to detect radio links of some numerologies used by only some carriers/cells.

Correspondingly, a procedure for detecting and processing a radio link in the multi-connection scenario is similar to that in the schematic flowchart of FIG. 5, and a main difference is as follows:

Different from operation 501 that a RAN node sends radio link detection parameters to the UE in the foregoing embodiment, the radio link detection parameters sent by the primary RAN node to the UE are shown in FIG. 10 or FIG. 11. In this embodiment of the present invention, the radio link detection parameters include an indication of a RAN node/cell/carrier used by the UE. In one embodiment, the primary RAN node may designate, by using RRC signaling as a default numerology used by the UE to detect a radio link, one numerology for each RAN node on each carrier/cell, and instruct the UE to detect a radio link of the default numerology.

Different from operation 502 in the foregoing embodiment, the UE detects a radio link of each numerology of each carrier/cell of each RAN node, to determine that radio links of some numerologies of some carriers/cells of some RAN nodes fail. In addition, a case in which the UE determines not to send a radio link failure report, but directly initiates an RRC connection re-establishment request includes: The UE detects that a weighted sum of number of consecutive out-of-sync times of numerologies on at least two carriers of at least two RAN nodes configured by the primary RAN node reaches a threshold set by a network; or radio links of more than a specific number of numerologies in the numerology indication list on carriers of the at least two RAN nodes fail; or radio links of all configured RAN nodes/cells/carriers/numerologies fail. In one embodiment, the RAN node may configure the UE to determine, in one of the foregoing implementations, a case in which the RRC connection re-establishment request is to be sent.

Different from operation 503 that the UE sends a numerology radio link failure report to the RAN node in the foregoing embodiment, after detecting that radio links of some numerologies fail, the UE selects a proper numerology of a carrier/cell of the RAN node in a priority order in the numerology indication list to report a carrier/cell link failure report to the RAN node.

Different from operation 504 of processing data on a numerology whose radio link fails in the foregoing embodiment, the UE and the RAN node process data on a plurality of numerologies of a plurality of carriers/cells of a plurality of RAN nodes. Correspondingly, the procedure for processing a numerology in operation 504 is applicable to a procedure for processing a numerology of a RAN node/carrier/cell in this embodiment of the present invention. For example, the RAN node and the UE transmit, by using a normal numerology of a carrier of a RAN node, to-be-retransmitted data on the numerology whose radio link fails.

In this embodiment, the UE performs differentiated link detection on radio links of numerologies of different carriers/cells of different RAN nodes based on radio link detection parameters of the numerologies of the different carriers/cells of the different RAN nodes, and when radio links of numerologies of one or more of the different carriers fail, may not immediately re-establish an RRC connection, avoiding impact on data transmission of another normal numerology of a carrier.

In an NR network, the RAN node has a function of supporting network slicing. In one embodiment, each network slice may use one numerology in an air interface. In this case, in the foregoing embodiment, the numerology indication in the radio link detection parameters configured by the RAN node for the UE may be replaced with an ID of a network slice. Further, the numerology indication list may be replaced with an ID list of network slices.

The solutions provided in the embodiments of the present invention are mainly described from a perspective of interaction between network elements and processing by the network elements. It may be understood that, to implement the foregoing functions, the network elements include corresponding hardware structures and/or software modules performing various functions. A person skilled in the art shall be very easily aware that, in combination with the embodiments disclosed in this specification, this disclosure can be implemented in a form of hardware or in a form of a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

This disclosure further provides embodiments of apparatuses implementing the operations and methods in the method embodiments. It should be noted that the apparatus embodiment may be used together with the method, or may be independently used.

FIG. 12 is a schematic structural diagram of UE according to an embodiment of the disclosure. As shown in FIG. 12, the UE 1200 includes a processor 1201, a memory 1202, and a communications interface 1203. The processor 1201 is connected to the memory 1202 and the communications interface 1203. For example, the processor 1201 may be connected to the memory 1202 and the communications interface 1203 by using a bus.

The processor 1201 is configured to support a RAN device in performing the corresponding functions in the method. The processor 1201 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 1202 is configured to: store signaling and data that need to be sent by the UE, receive signaling and data from the RAN device, and the like. The memory 1202 may include a volatile memory (Volatile Memory), for example, a random access memory (RAM). Alternatively, the memory 1202 may include a non-volatile memory (Non-Volatile Memory), for example, a read-only memory (ROM), a flash memory (Flash Memory), a hard disk drive (HDD), or a solid-state drive (SSD). Alternatively, the memory 1202 may include a combination of the foregoing types of memories.

The communications interface 1203 is configured to: communicate with the RAN device, receive signaling and data from the RAN device, and send signaling and data to the RAN device, where the signaling and data are used in the foregoing method.

The processor 1201 may perform the following operation: sending uplink signaling and data and/or receiving downlink signaling and data by using the communications interface 1203. The processor 1201 receives, by using the communications interface 1203, radio link detection parameters configured by a RAN node, detects radio links of one or more numerologies based on the configuration, and sends an RRC connection re-establishment request or a numerology radio link failure report based on a detection result by using the communications interface 1203. In one embodiment, when a link of a numerology whose radio link fails is resumed, an indication that the radio link of the numerology is resumed is reported to the RAN node by using the communications interface 1203. In addition, the processor 1201 further processes data on the numerology whose radio link fails. For details, refer to the implementations in FIG. 2 to FIG. 10.

Figure 13:
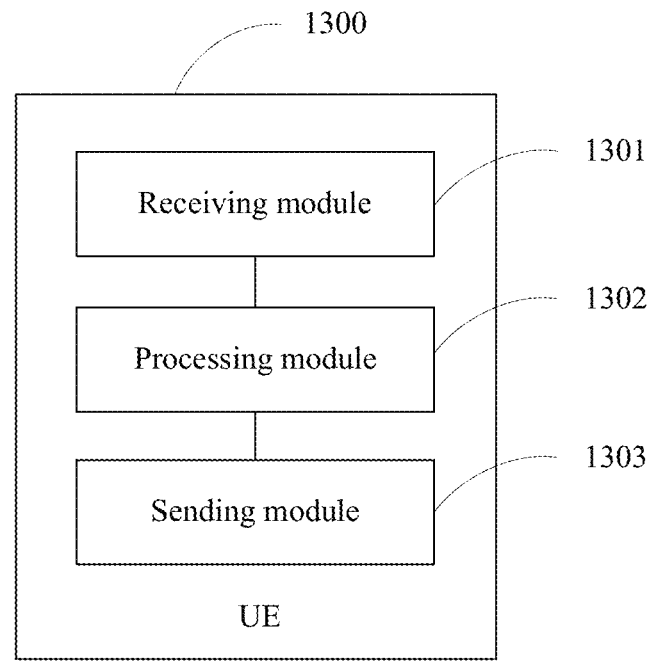
FIG. 13 is another schematic structural diagram of UE according to an embodiment of the present invention.

FIG. 13 is another schematic structural diagram of UE according to an embodiment of the disclosure. As shown in FIG. 13, the UE 1300 includes a receiving module 1301, a processing module 1302, and a sending module 1303.

The receiving module 1301 is configured to receive a message, for example, radio link detection parameters, configured by a RAN node, where the radio link detection parameters may include indications of one or more numerologies and a radio-link-failure-related parameter of each numerology.

The processing module 1302 performs corresponding processing based on the information received by the receiving module 1301, and sends some processing results by using the sending module 1303. The processing module 1302 detects radio links of the one or more numerologies based on the configuration, and generates an RRC connection re-establishment request or a numerology radio link failure report based on a detection result. In one embodiment, when a link of a numerology whose radio link fails is resumed, an indication that the radio link of the numerology is resumed is generated. In addition, the processing module 1302 further processes data on the numerology whose radio link fails. For details, refer to the implementations in FIG. 2 to FIG. 10.

The sending module 1303 is configured to send messages, such as the RRC connection re-establishment request, the numerology radio link failure report, and the indication that the radio link of the numerology is resumed, where the numerology radio link failure report and the indication that the radio link of the numerology is resumed may include one or more numerology indications.

Figure 14:
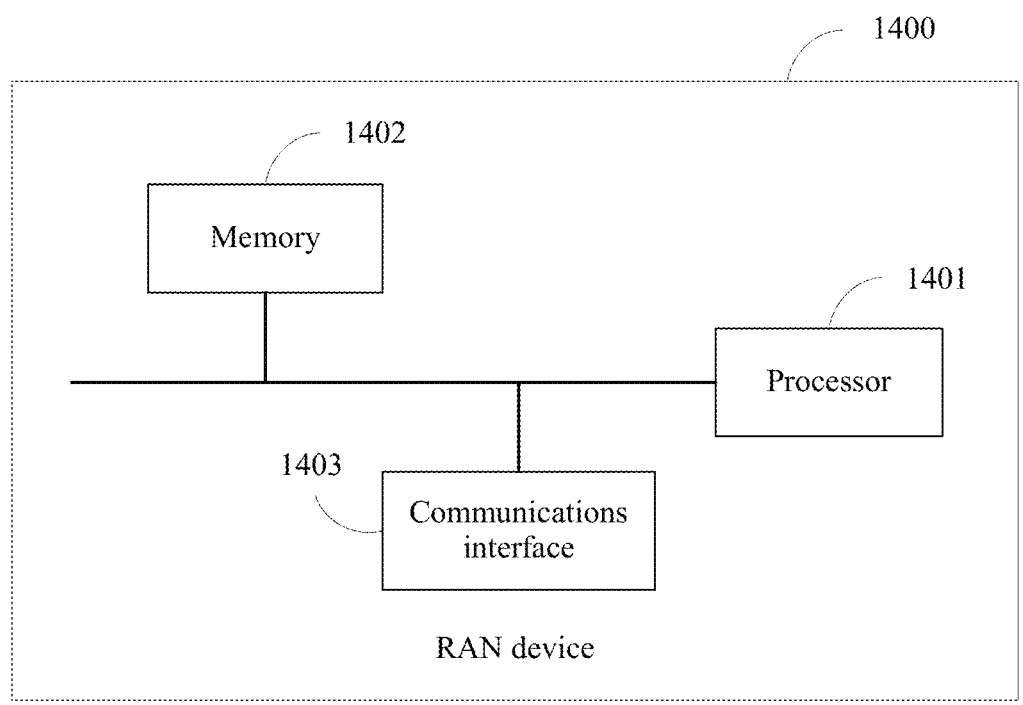
FIG. 14 is a schematic structural diagram of a RAN device according to an embodiment of the present invention.

FIG. 14 is a schematic structural diagram of a RAN device according to an embodiment of the disclosure. As shown in FIG. 14, the RAN device 1400 includes a processor 1401, a memory 1402, and a communications interface 1403. The processor 1401 is connected to the memory 1402 and the communications interface 1403. For example, the processor 1401 may be connected to the memory 1402 and the communications interface 1403 by using a bus.

The processor 1401 is configured to support the RAN device in performing the corresponding functions in the method. The processor 1401 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 1402 is configured to: store signaling and data that need to be sent by the RAN device, receive signaling and data from UE, and the like. The memory 1402 may include a volatile memory (Volatile Memory), for example, a random access memory (RAM). Alternatively, the memory 1402 may include a non-volatile memory (Non-Volatile Memory), for example, a read-only memory (ROM), a flash memory (Flash Memory), a hard disk drive (HDD), or a solid-state drive (SSD). Alternatively, the memory 1402 may include a combination of the foregoing types of memories.

The communications interface 1403 is configured to: communicate with the UE, receive signaling and data from the UE, and send signaling and data to the UE, where the signaling and data are used in the foregoing method.

The processor 1401 may perform the following operation:

sending signaling and data and/or receiving signaling and data by using the communications interface 1403. The processor 1401 configures, for each UE, radio link detection parameters of one or more numerologies used by the UE, and sends the configuration information to the UE by using the communications interface 1403; and receives, by using the communications interface 1403, an RRC connection re-establishment request message or a numerology radio link failure report sent by the UE. In one embodiment, when a link of a numerology whose radio link fails is resumed, an indication, which is sent by the UE, that the radio link of the numerology is resumed is received by using the communications interface 1403. RRC connection re-establishment processing is performed according to the RRC connection re-establishment request message sent by the UE, data on the numerology whose radio link fails is processed based on the numerology radio link failure report sent by the UE, or the like. For details, refer to the implementations in FIG. 2 to FIG. 10.

Figure 15:
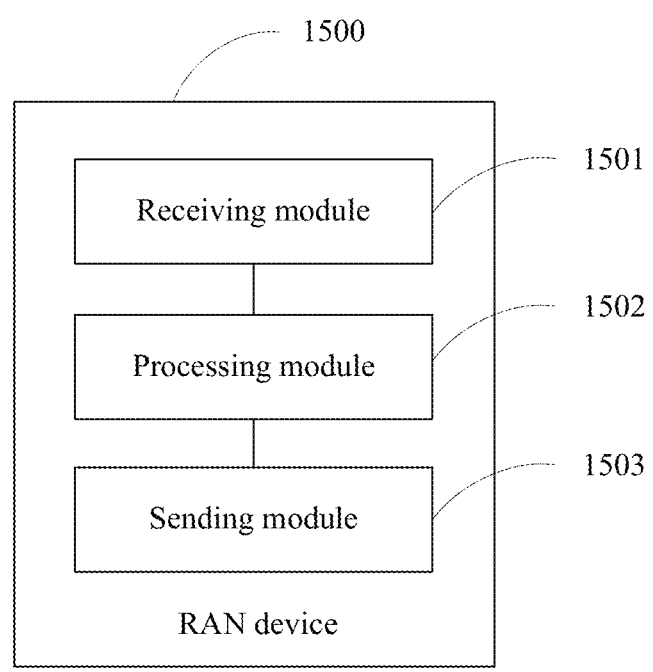
FIG. 15 is another schematic structural diagram of a RAN device according to an embodiment of the present invention.

FIG. 15 is another schematic structural diagram of a RAN device according to an embodiment of the disclosure. As shown in FIG. 15, the RAN device 1500 includes a receiving module 1501, a processing module 1502, and a sending module 1503.

The receiving module 1501 is configured to receive messages sent by UE, such as an RRC connection re-establishment request, a numerology radio link failure report, and an indication that a radio link of a numerology is resumed, where the numerology radio link failure report and the indication that the radio link of the numerology is resumed may include one or more numerology indications.

The processing module 1502 performs corresponding processing based on the information received by the receiving module 1501. The processing module 1502 configures, for each UE, radio link detection parameters of one or more numerologies used by the UE, and sends the radio link detection parameters to the UE. RRC connection re-establishment processing is performed according to the RRC connection re-establishment request message sent by the UE, data on a numerology whose radio link fails is processed based on the numerology radio link failure report sent by the UE and the indication that the radio link of the numerology is resumed, or the like. For details, refer to the implementations in FIG. 2 to FIG. 10.

The sending module 1503 is configured to send a message, for example, the radio link detection parameters, to the UE, where the radio link detection parameters may include indications of the one or more numerologies and a radio-link-failure-related parameter of each numerology.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units may be integrated into one unit.

When functions are implemented in the form of a software functional unit and sold or used as an independent product, the functions may be stored in a computer readable storage medium. Based on such an understanding, the technical solutions of this disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method for detecting and processing a radio link, comprising: receiving, by a terminal device, radio link detection parameters sent by an access network device, wherein the radio link detection parameters comprise radio link detection parameters of a plurality of wireless physical layer parameters, the plurality of wireless physical layer parameters correspond to different radio links, the radio link detection parameters comprise a wireless physical layer parameter indication list and radio-link-failure-related parameters of each wireless physical layer parameter, and the wireless physical layer parameter indication list comprises an indication of the plurality of wireless physical layer parameters;

sending, by the terminal device, a radio link failure report to the access network device, wherein the radio link failure report comprises the wireless physical layer parameter indication list indicating at least one of the radio links corresponding to a respective one of the wireless physical layer parameters being a failed radio link; and processing, by the terminal device, data on the failed radio link.

2. The method according to claim 1, wherein the sending, by the terminal device, a radio link failure report to the access network device comprises:

selecting, by the terminal device, a normal radio link to send the radio link failure report to the access network device, in accordance with a priority order in the wireless physical layer parameter indication list for one of the radio links not having the indication of the failed radio link.

3. The method according to claim 1, wherein the processing data on the failed radio link comprises:

scheduling, by the terminal device through scheduling performed by the access network device, the data on the failed radio link to a normal radio link for transmission; or transmitting, by the terminal device, to-be-retransmitted data on the failed radio link by using a normal radio link through scheduling performed by the access network device.

4. A terminal device, comprising:

a communications interface, configured to receive radio link detection parameters sent by an access network device, wherein the radio link detection parameters comprise radio link detection parameters of a plurality of wireless physical layer parameters, the plurality of wireless physical layer parameters correspond to different radio links, the radio link detection parameters comprise a wireless physical layer parameter indication list and radio-link-failure-related parameters of each wireless physical layer parameter, and the wireless physical layer parameter indication list comprises an indication of the plurality of wireless physical layer parameters, wherein the communications interface is configured to: send a radio link failure report to the access network device and transmit data on a failed radio link to the access network device, wherein the radio link failure report comprises the wireless physical layer parameter indication list indicating at least one of the radio links corresponding to a respective one of the wireless physical layer parameters being a failed radio link; and a processor, configured to process the data on the failed radio link.

5. The terminal device according to claim 4, wherein the communications interface is configured to send a radio link failure report to the access network device, comprises:

the processor selects a normal radio link to send the radio link failure report to the access network device by using the communications interface, in accordance with a priority order in the wireless physical layer parameter indication list for one of the radio links not having the indication of the failed radio link.

6. The terminal device according to claim 4, wherein the processor configured to process the data on the failed radio link comprises:

scheduling, by the processor through scheduling performed by the access network device, the data on the failed radio link to a normal radio link for transmission that is performed by using the communications interface; or transmitting, by the processor, to-be-retransmitted data on the failed radio link by using another normal radio link by using the communications interface through scheduling performed by the access network device.

* * * * *